(12) United States Patent
Daoud

(10) Patent No.: US 6,188,826 B1
(45) Date of Patent: Feb. 13, 2001

(54) OPTIC FIBER SLACK STORAGE BRACKET

(75) Inventor: Bassel H. Daoud, Parsippany, NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/397,890

(22) Filed: Sep. 17, 1999

(51) Int. Cl.⁷ .................................................. G02B 6/36
(52) U.S. Cl. ......................... 385/135; 385/136; 385/137
(58) Field of Search .................................. 383/135, 134, 383/136, 137, 139

(56) References Cited

U.S. PATENT DOCUMENTS 5,323,480 * 6/1994 Mullaney et al. .................... 385/135
5,553,186 * 9/1996 Allen .................................... 385/135

* cited by examiner

Primary Examiner—John D. Lee
Assistant Examiner—Benjamin Cushwa
(74) Attorney, Agent, or Firm—Hedman & Costigan, PC

(57) ABSTRACT

A slack storage bracket for use in fiber optic cable splice enclosures having a body, mounting members for mounting the slack storage bracket to the enclosure, and opposed radial shelf portions extending outwardly from the body to hold the cable slack. The shelf portions preferably have stops to keep the cable slack from slipping off of the shelf portions. The body of the bracket is preferably an arc which, like the radial shelf portions, have a radius of not less than the minimum bend radius of the cable to avoid damage to the cable.

15 Claims, 6 Drawing Sheets

OPTIC FIBER SLACK STORAGE BRACKET

FIELD OF THE INVENTION

The present invention relates to the field of optical fiber splice enclosures and, more particularly, storage structures for retaining fiber optic cable inside the enclosures.

BACKGROUND OF THE INVENTION

A significant amount of information is now carried over fiber optic cables. Presently, the majority of telephone and data transmission lines are or are being converted to fiber optics. Fiber optic lines, however, have their own unique issues which must be addressed. One such issue is splicing fiber optic lines.

Fiber optic splices are generally found, among other places, where the lines are brought into a building. When large numbers of splices are required in one place, i.e. at an office building, the splices are contained in an enclosure or housing. The splice enclosure is usually round, has an end cap through which the cable enters and exits and a sleeve which covers the structure holding the splices. In this regard, the end cap usually includes a bracket mounted thereon that holds a number of splice trays having splice holders which secure the individual splices.

Since fiber optic cable cannot be extended and new or repaired splices use up additional cable, it is common to keep an excess amount of cable slack in the enclosure for later splices. This is currently done by merely leaving slack hanging in the sleeve portion of the enclosure. The slack of the 300–400 cables which are spliced in an enclosure can quickly become unmanageable.

Additionally, fiber optic cable has unique physical limitations including a minimum bend radius wherein bending the cable in a radius smaller than the minimum bend radius jeopardizes the integrity of the fiber cable. The minimum bend radius of typical fiber optic cable is about 1½ inches.

SUMMARY OF THE INVENTION

The present invention is directed to a fiber optic cable slack storage bracket for use in a splice enclosure comprising a body including a mounting member for attachment of the bracket to a portion of the enclosure and opposed radial shelf portions extending outwardly from the body, said shelf portions having one or more stop members extending substantially perpendicular to the shelf portions to prevent the cable from slipping off of the shelf portions.

Similarly, the body of the bracket is preferably formed in an arc when used in a round enclosure, the radius of the arc being not less than the bend radius of the cable. Similarly, the shelf portions are formed in an arc having a radius which is not less than the bend radius of the cable.

Preferably, two opposed shelf portions are used so that the cable slack can be wound around the shelf portions in an oval or "figure eight" pattern. However, a unitary oval or circular shelf can be used, having opposed shelf portions thereon.

BRIEF DESCRIPTION OF THE DRAWINGS

The attached drawings, in which like reference characters represent like parts, are intended to illustrate the present invention without limiting the invention in any manner whatsoever.

DETAILED DESCRIPTION OF THE PREFERRED EMBODIMENT

Figure 1:
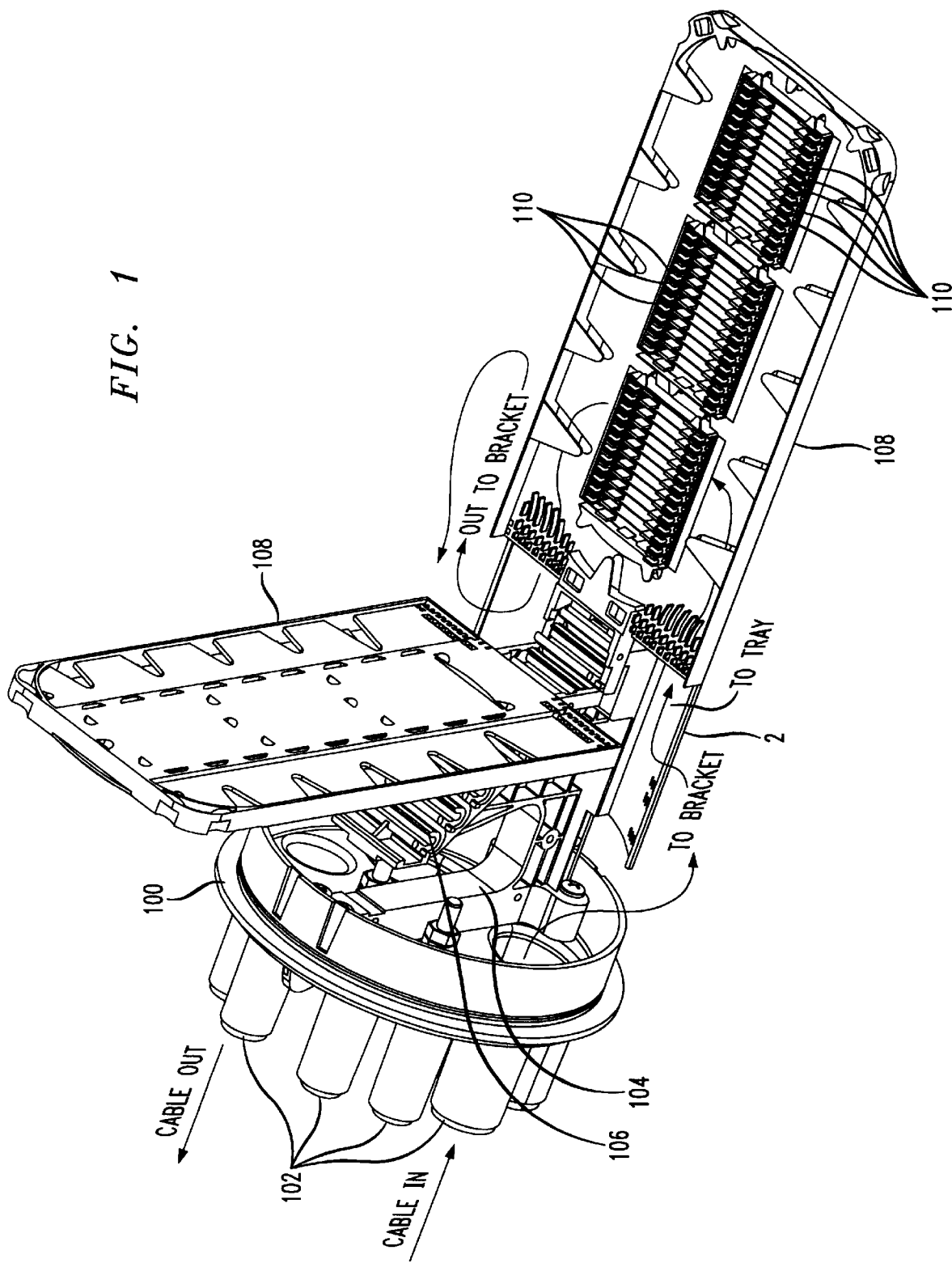
FIG. 1 is a perspective view of an end cap of a standard enclosure having a splice tray bracket and splice trays thereon as well as the bracket of the present invention.
Figure 2:
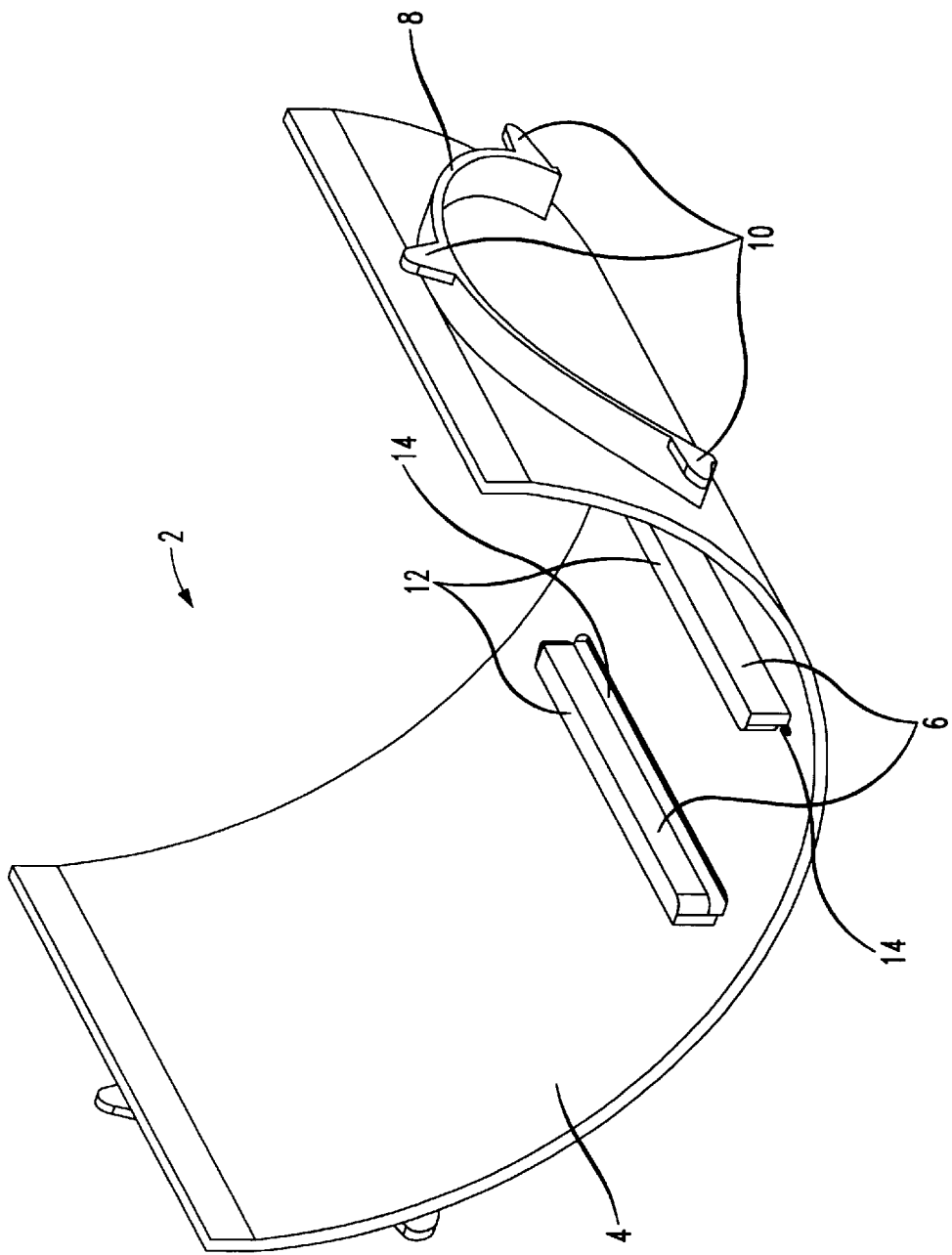
FIG. 2 is an internal perspective view of the preferred slack storage bracket of the present invention.
Figure 3:
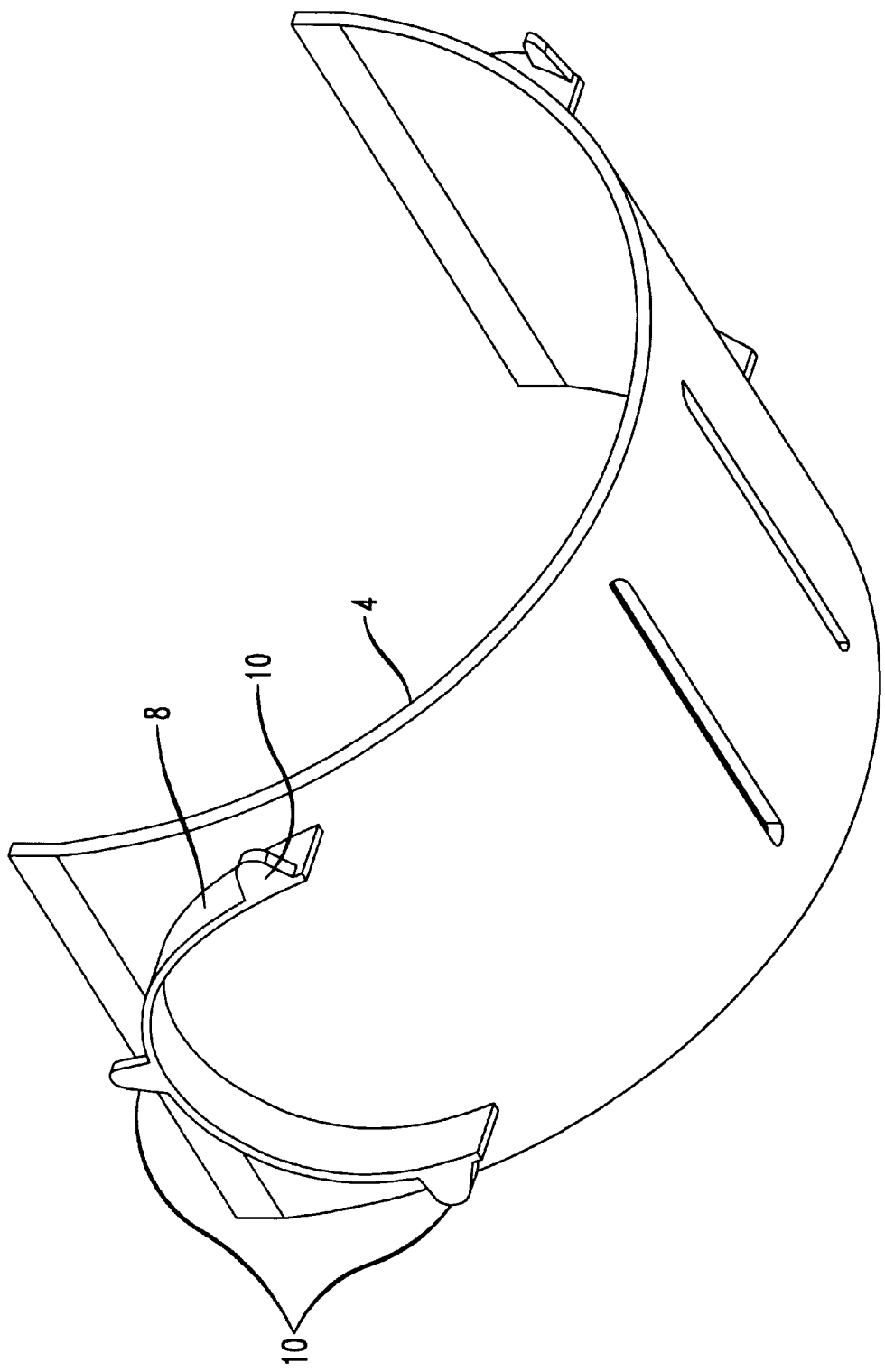
FIG. 3 is an external perspective view of the preferred slack storage bracket of FIG. 2.
Figure 4:
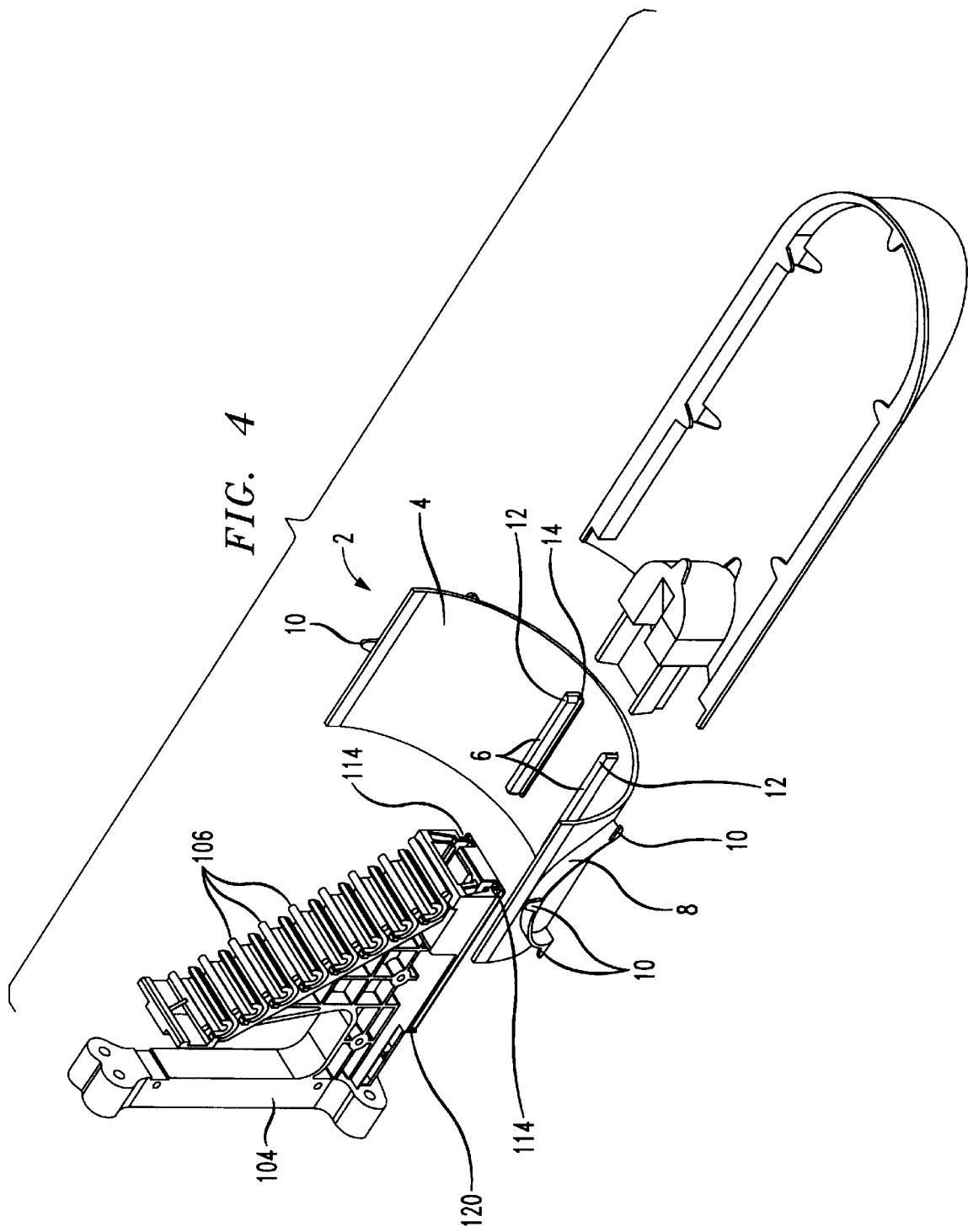
FIG. 4 is an exploded view of the present slack storage bracket and the splice tray bracket.
Figure 5:
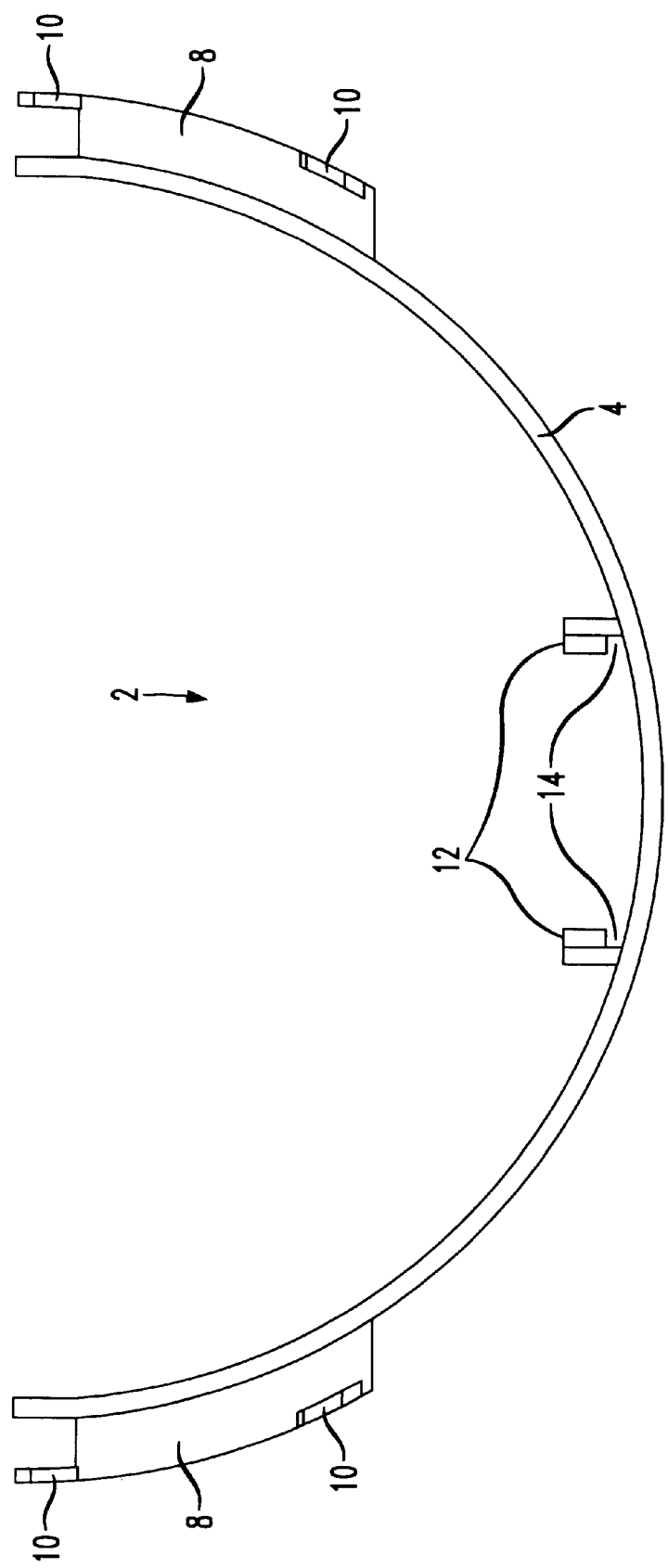
FIG. 5 is an end elevational view of the preferred slack storage bracket of FIG. 2.
Figure 6:
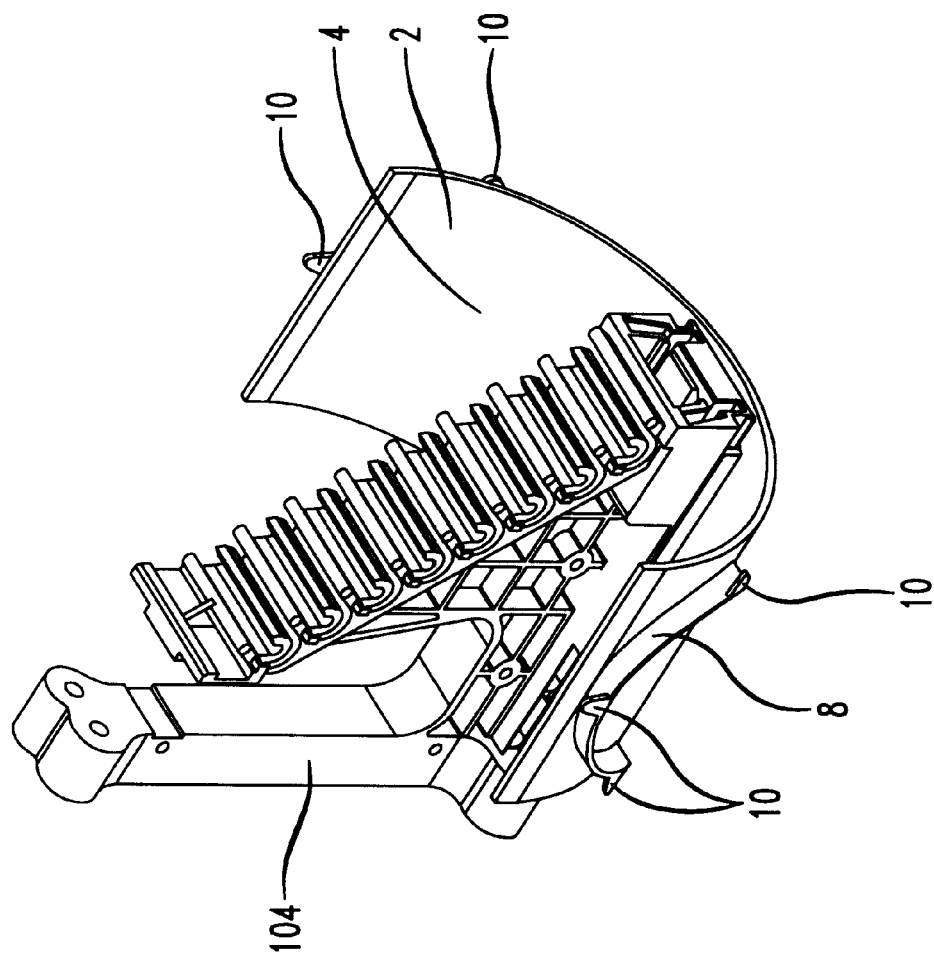
FIG. 6 is a perspective view of the slack bracket of the present invention attached to the splice tray bracket.

A splice enclosure generally includes a rounded sleeve (not shown) having a closed end and an open end covered by an end cap 100. The end cap 100 has openings 102 through which optic fiber cable enters and exits the enclosure. A splice tray bracket 104 is found in the enclosure, preferably attached to the end cap 100, which has mounting clips 106 for mounting splice trays 108. Each of the splice trays 108 have a plurality of cable splice holders 110 for holding the individual splices.

As shown in FIG. 1, the cable enters an opening 102 in the end cap 100 goes to the slack bracket 2 of the present invention, to the tray 108 where a splice is retained in the splice holder 110. The other end of the cable exits the splice held in the splice holder 110, exits the tray 108, goes to the slack bracket 2 and exits the end cap 100 through an opening 102.

The slack storage bracket 2 of the present invention, best shown in FIGS. 2–5, includes a body 4, mounting members 6 for attaching the bracket 2 to the splice tray bracket 104 and shelf portions 8 for holding the cable slack. Stop members 10 keep the slack on the shelf portions 8.

The slack bracket 2 is preferably attached to the splice tray bracket 104 by mounting members 6. The preferred mounting members 6 comprise raised dogs 12 having cut away portions 14 which cooperate with channels 114 on the splice tray bracket 104. Thus, the preferred mounting means for the slack bracket 2 provides that the dogs 12 of the mounting members 6 slide into channels 114 on the bottom of the splice tray bracket 104. Preferably, the channels 114 on the splice tray bracket 104 have stops 120 at the end of the channels 114 to ensure that the slack bracket 2 is properly positioned on the splice tray bracket 104.

Of course, other mounting members are contemplated depending on the application and preference of the designer. These include one or more adhesive strips which can adhere to the bottom of the splice tray bracket 104, VELCRO, snaps, keyways, etc.

In the preferred embodiment where the slack bracket 2 attaches to the bottom of the splice tray bracket 104, the body 4 of the slack bracket 2 is formed in the shape of an arc to wrap around the bottom of the preferred tray bracket 104 and within the enclosure sleeve, not shown. The radius of the arc of the slack bracket 2 is not less than the minimum bend radius of the cable.

The body 4 preferably has two opposed shelf portions 8 extending outwardly substantially normal to the body 4. The distance the shelf portions 8 extend from the body 4 depends on the amount of cable intended to be held and the diameters of the arc of the body 4 and the enclosure sleeve. The smaller the diameter of the body 4, the farther the shelf portions 8 can extend from the body 4 and not interfere with the enclosure sleeve.

At the terminal ends of the shelf portions are stops 10, which preferably extend substantially perpendicular from the terminal end of the outwardly extending shelf portions 8, to hold the cable slack on the shelf portions 8. The stops 10 can be in the form of tabs (as shown) or can be a solid stop 8 about the entire shelf portion 8.

Alternatively, the shelf portions 8 can be part of an oval or similar shape on the body 4 of the slack bracket 2, however, opposed arcs are preferred so that the slack can be wound in an "s" or "figure 8" fashion about the shelves 8. The cable wound on the shelves 8 is kept under some tension so that it is maintained properly within the stops 10 on the shelf portions 8. This winding method provides that the cable can be removed one loop at a time.

As with the arc of the body 4, the arc of the shelf portions 8 are of a diameter not less than the minimum bend radius of the cable to avoid damage to the cable.

In its most preferred embodiment, when used in an enclosure having an interior diameter of about 7 inches, the body 4 of the present invention is about 5¾ inches wide formed in a semicircle having a diameter of from about 5½ to about 5¾ inches. The shelf portions 8 are most preferably a semicircle having a diameter of from about 3 to about 3¼ inches and extend about ¼ to about ½ of an inch outwardly from the body 4. In this embodiment the stops 10 extend perpendicular to the shelves 8 for about ½ to about ¾ of an inch to hold about 50 loops of fiber cable.

In its preferred embodiment, the slack storage bracket 2 of the present invention is injected molded of a high density plastic. Most preferably, the bracket 2 is made of polycarbonate, the same material as the splice enclosure. However, any of a number of materials known to those in the art can be used.

Variations to the above description will make themselves apparent to one skilled in the art reading this disclosure. All such variations, alterations and modifications are intended to fall within the spirit and scope of the present invention limited only by the appended claims.

What is claimed is:

1. A fiber optic cable slack storage bracket for use in a splice enclosure comprising a body having an interior and an exterior, a mounting member for attachment of the bracket to a portion of the enclosure on the interior of the body and opposed radial shelf portions extending outwardly from the exterior of the body.

2. The slack storage bracket of claim 1 further comprising one or more stop members extending substantially normal to the radial shelf portions to prevent the cable from slipping off of the radial shelf portions.

3. The slack storage bracket of claim 1 wherein the opposed radial shelf portions are each formed in an arc, the radius of which is not less than a minimum bend radius of the fiber optic cable.

4. The slack storage bracket of claim 1 wherein the body is formed in an arc, the radius of which is not less than a minimum bend radius of the fiber optic cable.

5. The slack storage bracket of claim 1 wherein the portion of the enclosure to which the slack storage bracket is attached is a splice tray bracket and the mounting member comprises a first member which cooperates with a corresponding opposed member on said splice tray mounting bracket.

6. The slack storage bracket of claim 5 wherein the mounting member comprises a dog which cooperates with an opposed channel on the splice tray bracket.

7. The slack storage bracket of claim 6 wherein the mounting member comprises a plurality of dogs which cooperate with an equal number of channels on the splice tray bracket.

8. The slack storage bracket of claim 1 wherein the bracket is made of polycarbonate.

9. A fiber optic cable slack storage bracket for use in a splice enclosure comprising a body formed substantially in the shape of an arc having a radius not less than the minimum bend radius of the fiber optic cable and an interior and an exterior, a mounting member for attachment of the bracket to a portion of the enclosure on the interior of the body and opposed radial shelf portions extending outwardly from the exterior of the body.

10. The slack storage bracket of claim 9 further comprising one or more stop members extending substantially normal to the radial shelf portions to prevent the cable from slipping off of the radial shelf portions.

11. The slack storage bracket of claim 9 wherein the opposed radial shelf portions are each formed in an arc, the radius of which is not less than a minimum bend radius of the fiber optic cable.

12. The slack storage bracket of claim 9 wherein the portion of the enclosure to which the slack storage bracket is attached is a splice tray bracket and the mounting member comprises a first member which cooperates with a corresponding opposed member on said splice tray mounting bracket.

13. The slack storage bracket of claim 9 wherein the mounting member comprises a dog which cooperates with an opposed channel on the splice tray bracket.

14. The slack storage bracket of claim 9 wherein the mounting member comprises a plurality of dogs which cooperate with an equal number of channels on the splice tray bracket.

15. The slack storage bracket of claim 9 wherein the bracket is made of polycarbonate.

* * * * *